United States Patent [19]

Howes et al.

[11] Patent Number: 5,373,447

[45] Date of Patent: Dec. 13, 1994

[54] METHOD OF AND APPARATUS FOR VEHICLE TRACTION CONTROL BY DETECTING WHEEL SPIN

[75] Inventors: Michael J. Howes; Barry Bridgens, both of West Midlands, England

[73] Assignee: Lucas Industries, England

[21] Appl. No.: 2,784

[22] Filed: Jan. 8, 1993

[30] Foreign Application Priority Data

Jan. 10, 1992 [GB] United Kingdom ............ 9200445.6
Apr. 28, 1992 [GB] United Kingdom ............ 9209137.0

[51] Int. Cl.$^5$ .................... B60K 31/00; B60T 8/58
[52] U.S. Cl. .................... 364/426.03; 364/426.01; 180/197; 303/100
[58] Field of Search ............. 364/426.02, 426.03, 364/426.01; 180/197; 303/92-111

[56] References Cited

U.S. PATENT DOCUMENTS

| | | | |
|---|---|---|---|
| 4,823,269 | 4/1989 | Fujioka et al. | 364/426.03 |
| 5,002,148 | 3/1991 | Mijake et al. | 180/197 |
| 5,005,132 | 4/1991 | Yoshino | 364/426.02 |
| 5,015,042 | 5/1991 | Yoshino | 303/96 |
| 5,100,209 | 3/1992 | Arikawa | 303/96 |
| 5,124,921 | 6/1992 | Jonner et al. | 364/426.01 |
| 5,148,884 | 9/1992 | Tsuyama et al. | 180/197 |
| 5,154,151 | 10/1992 | Bradshaw et al. | 123/481 |
| 5,157,612 | 10/1992 | Satomi | 364/426.02 |
| 5,159,991 | 11/1992 | Tsuyama et al. | 180/197 |
| 5,258,914 | 11/1993 | Schmitt | 364/426.03 |

*Primary Examiner*—Thomas G. Black
*Assistant Examiner*—Tan Nguyen
*Attorney, Agent, or Firm*—Andrus, Sceales, Starke & Sawall

[57] ABSTRACT

A first difference is formed between the speeds of a front left wheel and a rear right wheel. A second difference is formed between the speeds of a front right wheel and a rear left wheel. The higher of the differences is compared with a threshold from a spin threshold generator to provide an indication of wheel spin, which may be used in a traction controller or in an antilock brake system.

20 Claims, 3 Drawing Sheets

METHOD OF AND APPARATUS FOR VEHICLE TRACTION CONTROL BY DETECTING WHEEL SPIN

BACKGROUND OF THE INVENTION

The present invention relates to a method of and an apparatus for detecting wheel spin. Such a method and apparatus may be used, for instance, in vehicle traction control systems.

In known traction control systems, for instance in vehicles driven by internal combustion engines, the drive to one or more of the driven wheels is reduced when wheel spin is detected so as to improve the drivability of the vehicle and prevent lateral instability. The speeds of the driven wheels are compared with a reference wheel speed and, when the speed of one or more driven wheel exceeds the reference speed by a detection threshold, the traction control system is actuated.

The reference speed may be determined in various ways. For instance, the reference speed may be determined as an average or mean value of the speeds of undriven wheels. Alternatively, the reference speed may be determined as the lower or lowest of the undriven wheel speeds.

Such systems perform well in many circumstances, particularly on surfaces of low coefficient of friction. However, a disadvantage can occur when cornering on a surface of high coefficient of friction. During cornering, the phenomenon of "weight transfer" occurs, whereby the weight on the outer wheels of the vehicle with respect to the centre of cornering increases whereas the weight on the inside wheels decreases. The weight on the inside driven wheel can be reduced to such an extent that wheel spin occurs prematurely. Indeed, the inside driven wheel can lift off the ground in extreme circumstances. The result of this is that unnecessarily early entry into traction control can occur when, in fact, adequate frictional contact between the outside driven wheel and the ground to prevent lateral instability is present.

The speed difference between the inside and outside wheels of a vehicle during cornering can be of the order of 2 or 3 kilometers per hour. In a typical traction control system, the spin threshold for actuating traction control can be between 4 and 6 kilometers per hour. By taking the reference wheel speed as the average of the undriven wheel speeds or the lower or lowest of the undriven wheel speeds, the detection threshold for traction control actuation can be reduced by a very substantial percentage, possibly as much as 50% or more, so that unnecessary traction control takes place on surfaces of relatively high friction.

SUMMARY OF THE INVENTION

According to a first aspect of the invention, there is provided an apparatus for detecting wheel spin for a vehicle having a front left wheel, a front right wheel, a rear left wheel, and a rear right wheel, comprising first difference forming means for forming the difference between the speeds of the front left wheel and the right rear wheel, second difference forming means for forming the difference between the speeds of the front right wheel and the rear left wheel, and comparison means for comparing at least one of the differences from the first and second difference forming means with a detection threshold.

The comparison means may be arranged to compare the higher of the differences from the first and second difference forming means with the detection threshold.

There may be provided means for determining surface friction and means for enabling the comparison means when the surface friction exceeds a friction threshold. There may be provided a third difference forming means for forming the difference between the speeds of a driven right wheel and a reference wheel speed and fourth difference forming means for forming the difference between the speed of a driven left wheel and the reference wheel speed, the comparison means being arranged to compare at least one of the differences from the third and fourth difference forming means with a further detection threshold when the surface friction is less than a further friction threshold. The further detection threshold may be the same as the detection threshold, and the further friction threshold may be the same as the friction threshold. The reference wheel speed may be the lower or lowest of speeds of undriven wheels.

According to a second aspect of the invention, there is provided a traction control system including an apparatus according to the first aspect of the invention and means responsive to the comparison means for reducing drive when the detection threshold is exceeded.

The means for determining surface friction may be arranged to compare reduced vehicle drive with a predetermined value, and update a surface friction estimate in accordance with the result of the comparison.

Preferably the means for determining surface friction is arranged to re-estimate surface friction during operation of a vehicle having the apparatus for detecting wheel spin and drive reducing means for reducing vehicle drive when the detection threshold is exceeded, the means for determining friction comprising, comparing means for comparing the reduced vehicle drive with a predetermined value, and updating means for updating a surface friction estimate in accordance with the result of the comparison by the comparing means.

Preferably the comparing means forms the difference between the reduced vehicle drive and the predetermined value, and the updating means adds to the surface friction estimate a value corresponding to the difference, for instance proportional thereto. Averaging means may be provided for periodically averaging the reduced vehicle drive, with the comparing means comparing the averaged reduced vehicle drive with the predetermined value.

Preferably the updating means periodically updates the surface friction estimate for as long as the drive reducing means reduces vehicle drive.

The surface friction estimating apparatus may be embodied within a vehicle traction control system which itself may be embodied within an engine management system.

According to a third aspect of the invention, there is provided a method of detecting wheel spin in a vehicle having a front left wheel, a front right wheel, a rear left wheel, and a rear right wheel, comprising forming the difference between the speeds of the front left wheel and the rear right wheel, forming the difference between the speeds of the front right wheel and the rear left wheel, and comparing at least one of the differences with a detection threshold.

Such a technique for detection of wheel slip may also be used in an anti-lock brake system (ABS), for instance in conjunction with wheel deceleration detection. The use of this technique in an ABS tends to delay entry into anti-lock brake operation under some conditions and could cause the inside driven wheel to lock. However, modern ABS are sufficiently fast-acting for this not to be a problem and consequently the use of the present technique could result in increased brake utilisation.

BRIEF DESCRIPTION OF THE DRAWING

The invention will be further described, by way of example, with reference to the accompanying drawings, in which.

DESCRIPTION OF THE PREFERRED EMBODIMENTS

Figure 1:
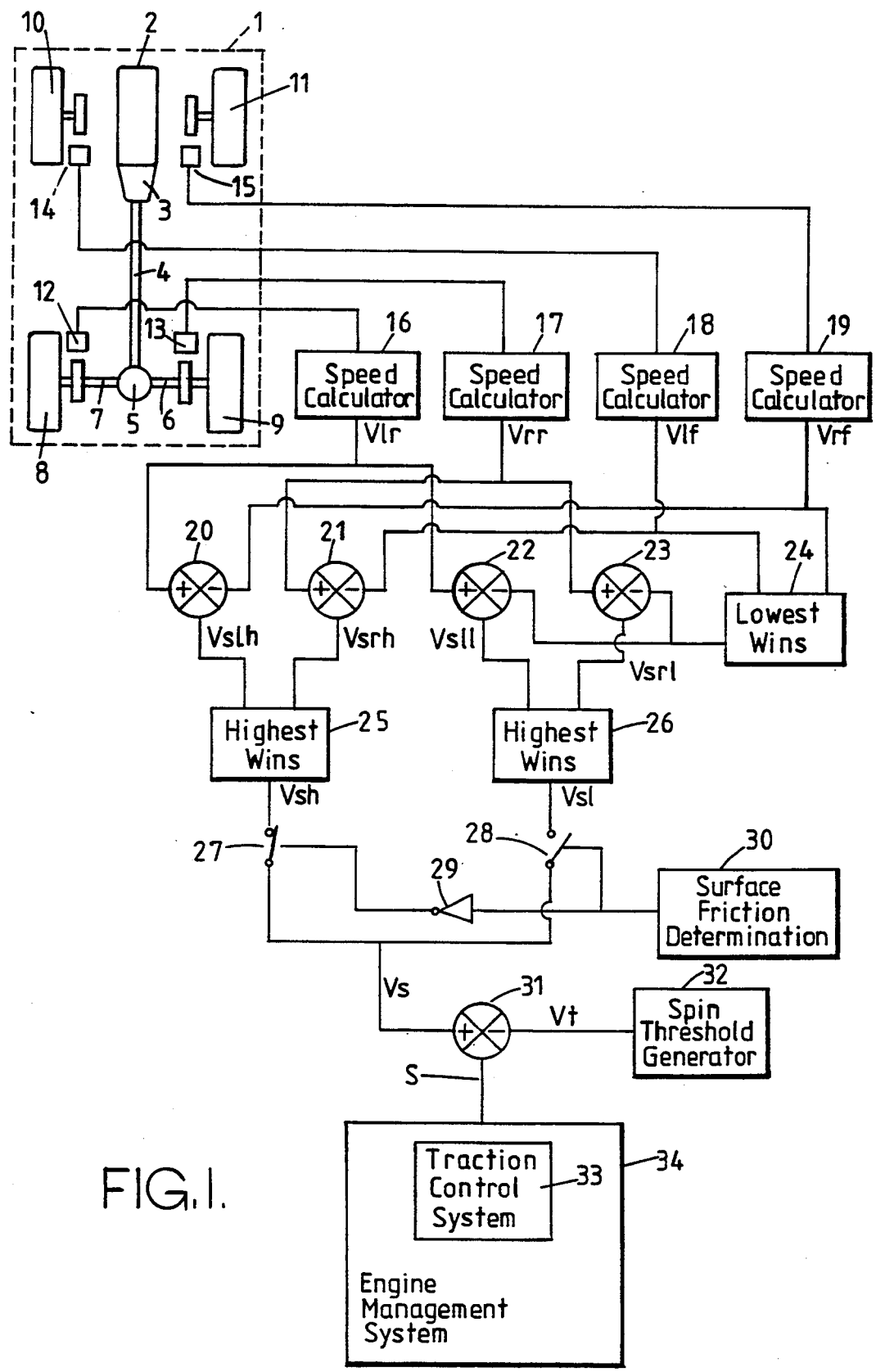
FIG. 1 is a schematic diagram of an apparatus for detecting wheel spin constituting an embodiment of the invention.

FIG. 1 shows a vehicle 1 driven by an internal combustion engine 2. The engine is connected via a gear box 3, a propeller shaft 4, a differential gear 5, and half shafts 6 and 7 to a left rear wheel 8 and a right rear wheel 9. The vehicle has an undriven front left wheel 10 and an undriven right front wheel 11. The wheels 8 to 11 are provided with respective wheel speed sensors 12 to 15, respectively. Each of the wheel speed sensors may, for instance, comprise a toothed wheel cooperating with a variable reluctance transducer.

The speed sensors 12 to 15 are connected to speed calculators 16 to 19 which produce wheel speed signals Vlr, Vrr, Vlf and Vrf representing the speeds of the left rear wheel 8, the right rear wheel 9, the left front wheel 10, and the right front wheel 11, respectively. The output of the speed calculator 16 is connected to the positive inputs of subtractors 20 and 22. The output of the speed calculator 17 is connected to the positive inputs of subtractors 21 and 23. The output of the speed calculator 18 is connected to the negative input of the subtractor 21. The output of the speed calculator 19 is connected to the negative input of the subtractor 20. The outputs of the speed calculators 18 and 19 are also connected to the inputs of a lowest wins circuit 24, whose output supplies the lower of the undriven front wheel speeds to the negative inputs of the subtractors 22 and 23. The output Vslh of the subtractor 20 is the difference between the speed of the left rear driven wheel 8 and the speed of the right front undriven wheel 11, and represents the wheel spin of the left rear driven wheel 8 which is used for traction control on a surface of relatively high friction. The output Vsrh of the subtractor 21 comprises the difference between the speed of the right rear driven wheel 9 and the speed of the left front undriven wheel 10, and represents the amount of wheel spin of the right rear driven wheel for use in traction control on the high friction surface. The output of the subtractor 22 comprises the difference between the speed of the left rear driven wheel 8 and the lower of the speeds of the undriven wheels 10 and 11, and represents the wheel spin of the left rear driven wheel 8 for use in traction control for a surface of relatively low friction. The output of the subtractor 23 comprises the difference between the speed of the right rear driven wheel 9 and the lower of the undriven front wheel speeds and represents the wheel spin of the right rear driven wheel 9 for use in traction control on relatively low friction surfaces.

The outputs of the subtractors 20 and 21 are supplied to the inputs of a highest wins circuit 25, whose output Vsh is the higher of the wheel spin speeds Vslh and Vsrh and represents the wheel spin for traction control on the high friction surface. The outputs of the subtractors 22 and 23 are connected to the inputs of a highest wins circuit 26 whose output Vsl is equal to the higher of the wheel spin speeds Vsll and Vsrl and represents the wheel spin speed for traction control on the lower friction surface. The outputs of the circuits 25 and 26 are connected to electronic changeover switch means shown as electronic switches 27 and 28 and an inverter 29. the changeover switch means are controlled by a surface friction determination circuit 30, described hereinafter, which determines the friction of the surface on which the vehicle 1 is moving. Another example of suitable means for determining surface friction is disclosed in British Patent No 2002473.

The output of the changeover switch means comprises a signal Vs which represents the prevailing wheel spin. This signal is supplied to the positive input of a subtractor 31, whose negative input receives a threshold spin signal Vt from a spin threshold generator 32. The spin threshold Vt may comprise a fixed value or may vary as a function of vehicle operating parameters, for instance vehicle speed. The output of the subtractor 31 is connected to an input of a traction control system 33 forming part of an engine management system 34, having further inputs connected to other transducers and outputs connected to the engine 2 for controlling ignition timing and the composition and quantity of combustible mixture.

In use, the surface friction determination circuit 30 determines the friction of the surface on which the vehicle 1 is moving and compares this with a threshold friction. When the surface friction is less than the friction threshold, the circuit 26 is connected to the subtractor 31 by the electronic switch 28 and wheel spin detection is based on the differences between the speeds of the driven wheels 8 and 9 and the lower speed of the undriven wheels 10 and 11, as described in European Patent specification No 0493910. When the surface friction is greater than the friction threshold, the circuit 26 is disconnected from the subtractor 31 whereas the circuit 25 is connected via the switch 27 to the subtractor 31. The subtractors 20 and 21 thus form the differences between the speeds of diagonally opposite wheels of the vehicle 1 and the higher of these differences is passed to the subtractor 31 where it is compared with the threshold value Vt. When the threshold Vt is exceeded, the subtractor 31 supplies the difference signal, indicating the detection of wheel spin, to the traction control system 33. The traction control system causes the engine management system 34 to reduce the demanded drive or output of the engine 2 until the wheel spin signal Vs falls below a threshold value which may be equal to the threshold value Vt, whereupon normal drive may be resumed in accordance with the operation of the traction control system 33 and the engine management system 34.

By comparing the speeds of diagonally opposite wheels of the vehicle 1, the entry threshold for traction control initiated by detecting wheel spin of the inside wheel during cornering is effectively raised. This has the advantage that false triggering caused, for instance, when the inside driven wheel carries reduced weight or lifts off the ground is substantially reduced. For instance, in a typical situation, the difference in wheel speeds between the inside and outside wheels of the vehicle may be 3 kilometers per hour. The spin threshold Vt may typically be 6 kilometers per hour. Thus, the spin threshold applicable to the inside wheel becomes approximately 9 kilometers per hour so that false or unnecessarily early triggering of traction control from the inside driven wheel is prevented or reduced under conditions when the performance of the vehicle is not compromised.

Similarly, the spin threshold for the outside driven wheel is reduced by a corresponding amount, for instance by 2 or 3 kilometers per hour. Because of the weight transfer during cornering to the outside wheels, the outside driven wheel is providing most of the lateral adhesion. The spin threshold is effectively lowered for the outside wheel so as to cause earlier entry into traction control in the event of outside wheel spin, thus improving the lateral stability of the vehicle.

Figure 2:
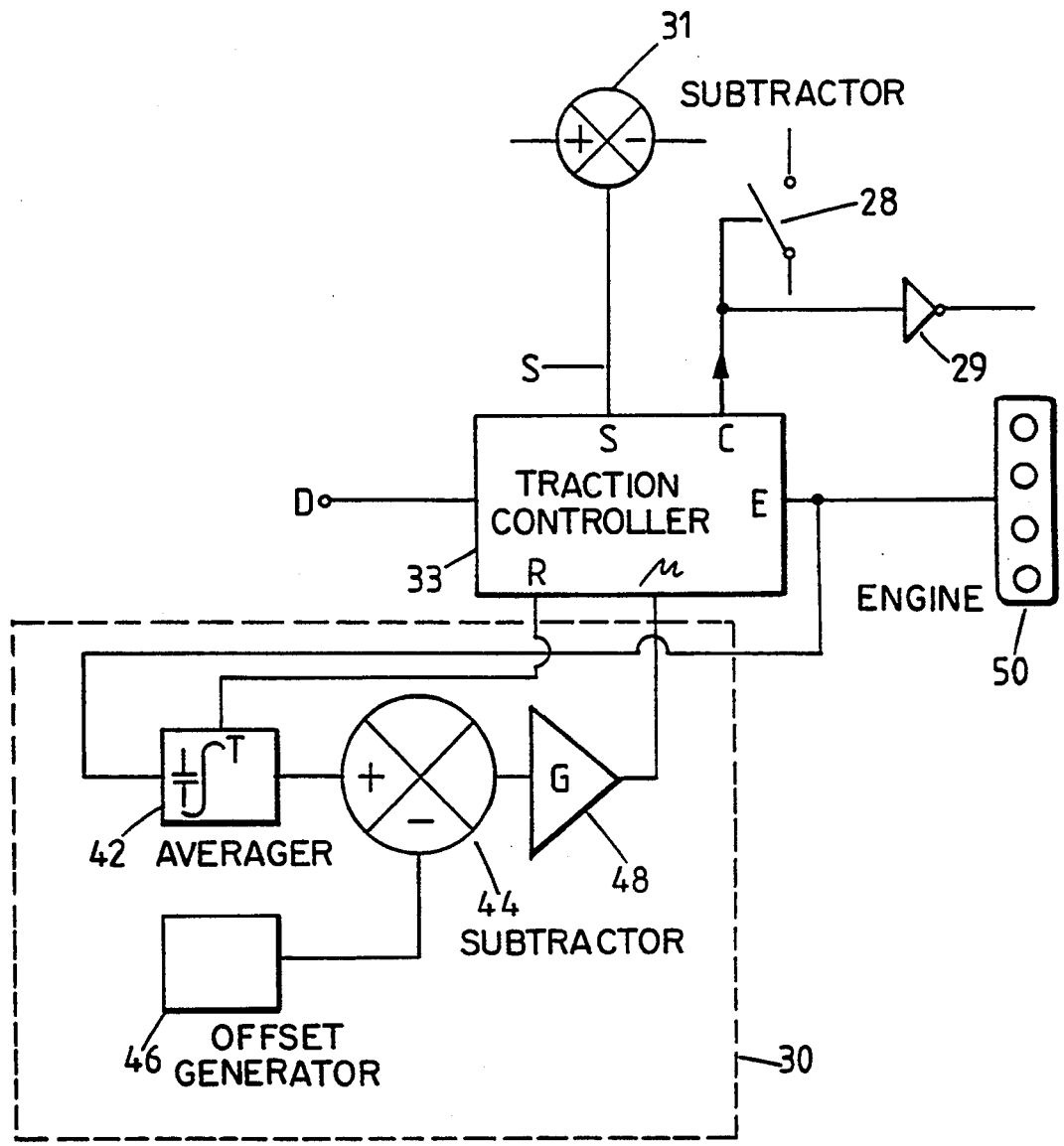
FIG. 2 is a schematic diagram showing a surface friction estimating means.

FIG. 2 shows the surface friction circuit 30 and the traction control system 33 in greater detail. The output of the subtractor 31 is connected to a spin input S of the traction controller 33.

The traction controller 33 receives a driver demand input D, for instance from an accelerator pedal sensor, and has an engine output demand output E for controlling the output of an engine 50. An input of an averager 42 of the surface friction circuit 30 is connected to the engine output demand output of the traction controller. A reset output R of the traction controller is connected to a reset input of the averager 42. The output of the averager is connected to an adding input of a subtractor 44. An offset generator 46 has an output connected to a subtracting input of the subtractor 44. The output of the subtractor 44 is connected to the input of an amplifier 48. An output of the amplifier 48 is connected to a third input $\mu$ of the traction controller 33. A control output C of the traction controller is connected to the change over switch, shown as the electronic switches 27 and 28 and the inverter 29.

The traction controller 33 sets the engine output demand equal to the driver demand input when the amount of wheel spin Vs is below the entry threshold Vt. When the amount of wheel spin exceeds the entry threshold, the traction controller reduces the engine output demand in accordance with a predetermined control strategy to reduce the wheel spin to acceptable levels. During the time when the traction controller 33 is performing traction control, the reset signal is removed from the averager 42. The averager 42 forms an average of the engine output demand over a plurality of consecutive predetermined periods during traction control. An offset is subtracted from each average engine output demand and the result is multiplied by a constant by the amplifier 48. The output of the amplifier represents a modifying value. The modifying value is supplied to the third input $\mu$ of the traction controller 33.

The modifying value is added to a variable SURFACE at the end of each predetermined period in which the traction controller is performing traction control. The variable SURFACE holds an estimate of the surface friction of the surface over which the vehicle is travelling and is stored by the traction controller. The averager 42 is reset at the end of each predetermined period. Further averaging of the engine demand and updating of the variable, SURFACE, are performed while the traction controller 33 continues to perform traction control. The predetermined period is typically of the order of 1 second.

The value of the offset may be determined by testing the performance of a test vehicle of the same type on a plurality of different surfaces. Once a suitable value for the offset has been identified, it may be permanently set for that type of vehicle.

The surface friction estimating apparatus 30 can conveniently be embodied by a programmed data processor. Thus, the traction controller 33, the averager 42, the subtractor 44, the offset generator 46 and the amplifier 48 may all be embodied as a programmed data processor. The value of the offset and the gain used for each vehicle, or each type of vehicle, is stored in read only memory.

The time spent performing traction control and the amount to which the engine output demand is controlled is used as a measure of the surface friction. When the vehicle is driving over a low friction surface, the traction controller limits the engine output demand to relatively small values. However when the vehicle passes over a surface with a larger coefficient of friction, the traction controller is generally not required to make large reductions in the engine output demand and consequently the engine output demand may take relatively large values.

The average value of the engine output demand is used to calculate the modifier as follows:

$$\text{modifier} = (\text{average value} - \text{offset}) * \text{gain}.$$

The modifier can have a positive or a negative value depending on whether the average value of the engine output demand is greater or less than the offset. The modifier is added to the variable, SURFACE. Thus the value of SURFACE can either increase or decrease depending upon the level to which the traction controller controls the engine output demand. The rate of change of the value of SURFACE is also dependent upon the value of the gain used. Greater gains result is increased rates of change for SURFACE, but the gain is limited by other considerations, such as stability. Thus driving on a low friction surface will cause SURFACE to tend towards a relatively low value, whilst driving on a high friction surface will cause SURFACE to tend towards a relatively high value.

The value of SURFACE is constrained to lie within upper and lower boundaries.

Parameters of the traction controller, such as the entry threshold set by the spin threshold generator 32 can be made dependent upon the value of SURFACE. Thus, it is possible to tune the response of the traction controller, for instance by making the entry threshold proportional to the value of SURFACE.

The estimate of the surface friction represented by the variable SURFACE is stored in non-volatile memory. Thus, the most recent estimate of friction remains available even if the vehicle ignition has been switched off.

The value of SURFACE is used to control the operation of the switches 27 and 28. In a specific application of the friction estimating apparatus to a specific vehicle, the value of SURFACE is constrained to lie between 0 and 30000. A very slippy surface is represented by low values of SURFACE close to 0, whereas a high grip surface is represented by values close to 30000. The switches 27 and 28 are arranged to select the lower undriven wheel speed as the reference speed when the value of SURFACE is less than 10000. The larger of the differences between the speeds of diagonally opposite wheels is passed to the subtractor 31 when SURFACE is greater than or equal to 10000. The offset value is set to 300 where the engine output demand is constrained to values between 0 representing zero driver demand and 1023 representing maximum driver demand. A value of 64 is selected for the gain.

Figure 3:
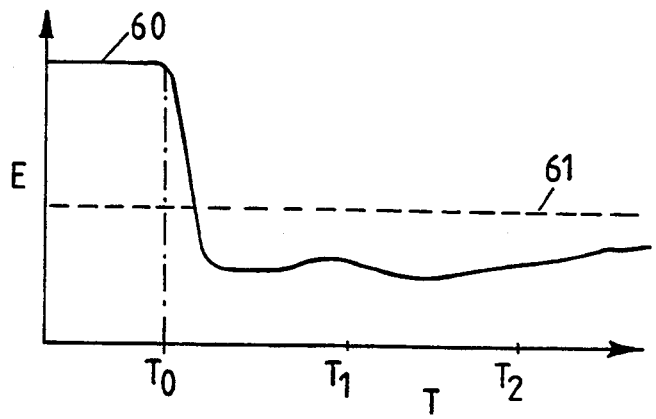
FIG. 3 is a graph representing engine output demand when spin occurs.

FIG. 3 shows a graph of engine output demand E plotted along the abscissa against time T plotted along the ordinate for a vehicle fitted with the traction controller and friction estimating apparatus of FIG. 1. A continuous line 60 represents the engine output demand whereas a broken line 61 represents the value of the offset. At time $T_0$, the vehicle moves on to a low friction surface and excessive wheel spin is detected. The traction controller 33 intervenes reducing the engine output demand 60 so as to tend to reduce the wheel spin to an acceptable target value. The averager 42 receives and averages the engine output demand E for the period $T_0$ to $T_1$. At time $T_1$, the offset is subtracted from the average of the engine output demand by the subtractor 44. The result is then multiplied by the gain of the amplifier 48 to form the modifier, which is added in the controller 33 to the variable SURFACE so as to update the estimate of the surface friction. The averager 42 is reset and then averages the engine output demand for the period $T_1$ to $T_2$. The updating as described above is repeated at the end of each period during which the traction controller 33 reduces the engine output demand. Typically the averaging is performed for successive periods of 1 second.

Figure 4:
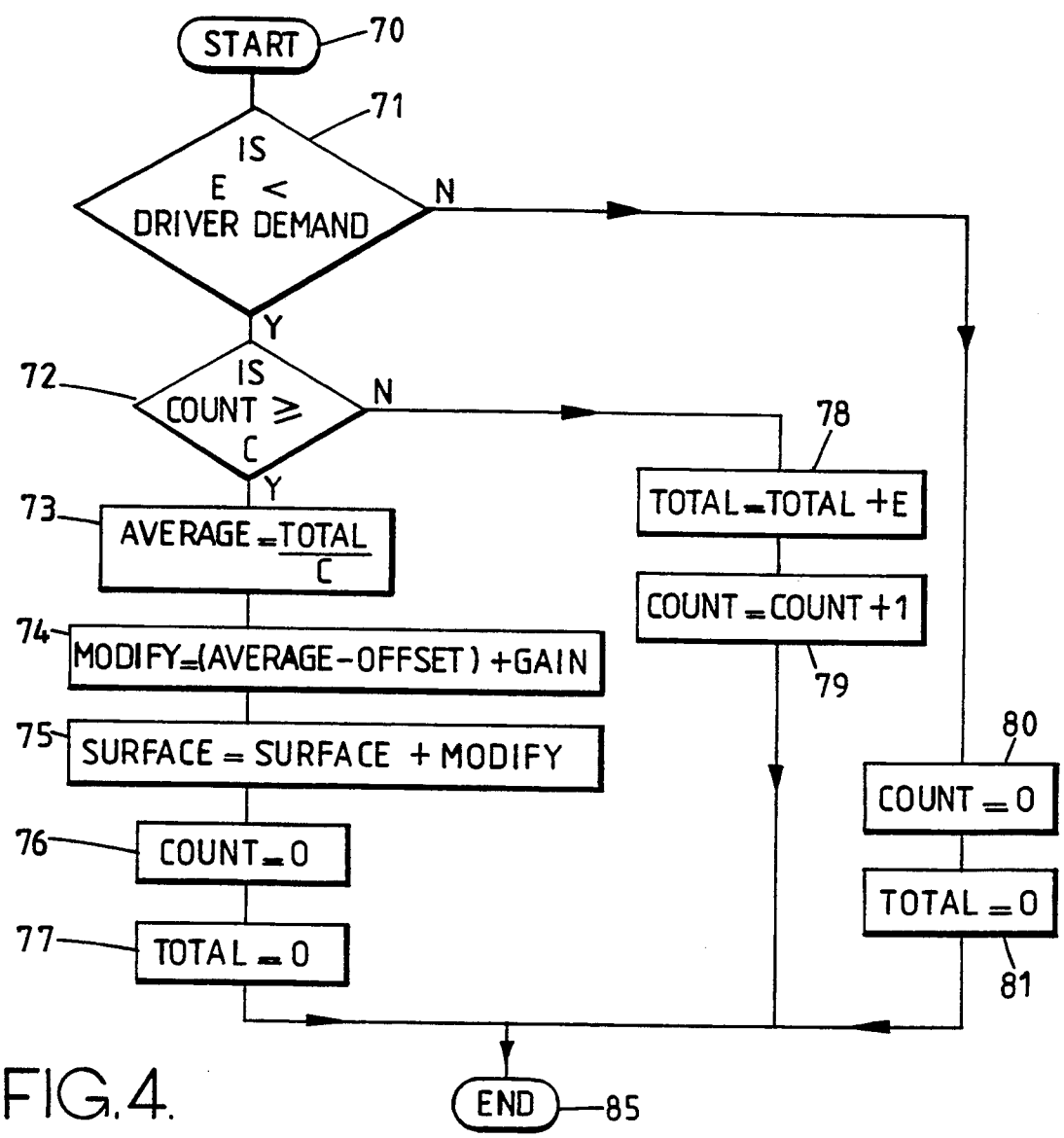
FIG. 4 is a flow diagram illustrating operation of the surface friction estimating means.

FIG. 4 is a flow diagram for a routine for estimating surface friction. The routine is suitable for inclusion into a traction controller embodied by a programmable data processor. The routine starts at step 70 in response to an interrupt request. The engine output demand E is compared with the driver demand at step 71 to determine if the traction controller has intervened to reduce the engine output power. Control is passed to step 72 if the engine output demand E is less than the driver demand, or to step 80 if the engine output demand in not less than the driver demand. A variable COUNT which stores the number of times that the routine has been executed is compared with a constant C at step 72. If COUNT is greater than or equal to C control is passed to step 73. Control is passed to step 78 if COUNT is less than C.

The variables COUNT and C control the period of time over which the average of the engine output demand is formed. For example, if the average is to be taken over intervals of 1 second duration and the routine is executed at intervals of 10 mS, then the value of C would be set to 100.

The engine output demand is added to a variable TOTAL at step 78. Control is then passed to step 79 where COUNT is incremented. The routine is then exited at step 85.

At the end of each averaging interval when COUNT=C, TOTAL is divided by C at step 73 to form an average of the engine output demand. The value of MODIFY is calculated at step 74 by subtracting an offset from the average of the engine output demand and then multiplying the result by a constant, GAIN. Control is then passed to step 75 where the variable SURFACE is updated by the addition MODIFY. The variables COUNT and TOTAL are then reset to zero at steps 76 and 77. The routine is exited at step 85.

At the end of traction control, the variable COUNT is reset to zero at step 80. Control is then passed to step 81 where the variable TOTAL is reset to zero. The routine is then exited at step 85.

As before, SURFACE is constrained to lie between upper and lower limits. Such constraining steps are not shown but may be associated with the step 75. The variable SURFACE is stored in non-volatile memory so as to maintain an estimate of surface friction even when the vehicle ignition is switched off.

It is thus possible to provide an apparatus for detecting spin and a traction controller in which the operation is modified in response to measurements of surface friction.

We claim:

1. An apparatus for detecting wheel spin for a vehicle having a front left wheel, a front right wheel, a rear left wheel and a rear right wheel, said apparatus comprising a first difference forming means for forming a first difference between a speed of the front left wheel and a speed of the rear right wheel, a second difference forming means for forming a second difference between a speed of the front right wheel and a speed of the rear left wheel, and comparison means for comparing at least one of the first and second differences with a detection threshold representing a maximum desirable wheel spin value.

2. An apparatus as claimed in claim 1, further comprising surface friction determining means for determining surface friction, and said comparison means being arranged to compare at least one of the first and second differences with the detection threshold when the surface friction exceeds a friction threshold.

3. An apparatus as claimed in claim 1, in which said comparison means is arranged to compare a larger of the first and second differences with the detection threshold.

4. An apparatus as claimed in claim 2, further comprising third difference forming means for forming a third difference between a speed of a driven right wheel and a reference wheel speed, and fourth difference forming means for forming a fourth difference between a speed of a driven left wheel and the reference wheel speed, said comparison means being arranged to compare at least one of the third and fourth differences with a further detection threshold when the surface friction is less than a further friction threshold.

5. An apparatus as claimed in claim 4, in which the further detection threshold is the same as the detection threshold and the further friction threshold is the same as the friction threshold.

6. An apparatus as claimed in claim 4, in which the reference wheel speed is a lowest speed of undriven wheels.

7. A traction control apparatus comprising:
an apparatus for detecting wheel spin for a vehicle having an engine, a front left wheel, a front right wheel, a rear left wheel and a rear right wheel; and
drive reducing means for reducing an output demand of the engine, said apparatus for detecting wheel spin comprising a first difference forming means for forming a first difference between a speed of the front left wheel and a speed of the rear right wheel, a second difference forming means for forming a second difference between a speed of the front right wheel and a speed of the rear left wheel, and comparison means for comparing at least one of the first and second differences with a detection threshold representing a maximum desirable wheel spin value, said drive reducing means being arranged to be responsive to said first comparison means for reducing the engine output demand when that least one of the first and second differences is greater than the detection threshold.

8. A traction control apparatus as claimed in claim 7, further comprising surface friction determining means for determining surface friction, said comparison means being arranged to compare at least one of the first and second differences with the detection threshold when the surface friction exceeds a friction threshold.

9. A traction control apparatus as claimed in claim 7, in which said comparison means is arranged to compare a larger of the first and second differences with the detection threshold.

10. A traction control apparatus as claimed in claim 8, further comprising third difference forming means for forming a third difference between a speed of a driven right wheel and a reference wheel speed, and fourth difference forming means for forming a fourth difference between a speed of a driven left wheel and a reference wheel speed, said comparison means being arranged to compare at least one of the third and fourth differences with a further detection threshold when the surface friction is less than a further friction threshold.

11. A traction control apparatus as claimed in claim 10, in which the further detection threshold is the same as the detection threshold and the further friction threshold is the same as the friction threshold.

12. A traction control apparatus as claimed in claim 10, in which the reference wheel speed is a lowest speed of undriven wheels.

13. A traction control apparatus as claimed in claim 7, further comprising surface friction determining means for determining surface friction, said surface friction determining means comprising drive comparing means for comparing the reduced engine output demand with a predetermined value, and updating means for updating a surface friction estimate in accordance with a result of a comparison by said drive comparing means.

14. A traction control apparatus as claimed in claim 13, in which said drive comparing means is arranged to form a fifth difference between the reduced engine output demand and the predetermined value, and said updating means is arranged to add to the surface friction estimate a value which is a predetermined function of the fifth difference.

15. A traction control apparatus as claimed in claim 14, in which the value added to the surface friction estimate is proportional to the fifth difference.

16. A traction control apparatus as claimed in claim 13, further comprising averaging means for periodically averaging the reduced engine output demand, said drive comparing means being arranged to compare an averaged reduced engine output demand with the predetermined value.

17. A traction control apparatus as claimed in claim 13, in which said updating means is arranged to update the surface friction estimate for as long as said drive reducing means reduces the engine output demand.

18. A method of detecting wheel spin in a vehicle having a front left wheel, a front right wheel, a rear left wheel and a rear right wheel, comprising forming a first difference between a speed of the front left wheel and a speed of the rear right wheel, forming a second difference between a speed of the front right wheel and the rear left wheel and comparing at least one of said first and second differences with a detection threshold representing a maximum desirable wheel spin value.

19. A method as claimed in claim 18, in which a larger of said first and second differences is compared with the detection threshold.

20. A method as claimed in claim 18, in which said comparing is performed when a surface friction exceeds a friction threshold.

* * * * *